US011295473B2

(12) United States Patent
Tauber

(10) Patent No.: US 11,295,473 B2
(45) Date of Patent: Apr. 5, 2022

(54) CONTINUOUS LOCAL 3D RECONSTRUCTION REFINEMENT IN VIDEO

(71) Applicant: INTEL CORPORATION, Santa Clara, CA (US)

(72) Inventor: Elad Tauber, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 16/719,557

(22) Filed: Dec. 18, 2019

(65) Prior Publication Data

US 2020/0126257 A1 Apr. 23, 2020

(51) Int. Cl.
| G06T 15/20 | (2011.01) |
| G06T 17/00 | (2006.01) |
| G06T 7/292 | (2017.01) |
| G06T 7/55 | (2017.01) |
| G06T 7/73 | (2017.01) |

(52) U.S. Cl.
CPC ............. *G06T 7/75* (2017.01); *G06T 7/292* (2017.01); *G06T 15/205* (2013.01); *G06T 2207/10028* (2013.01)

(58) Field of Classification Search
None
See application file for complete search history.

(56) References Cited

U.S. PATENT DOCUMENTS

| 2015/0070468 | A1* | 3/2015 | Pfeffer | G01B 21/045 |
| | | | | 348/46 |
| 2019/0051014 | A1* | 2/2019 | Kahle | H04N 7/181 |
| 2019/0226846 | A1* | 7/2019 | Siercks | G06T 7/0002 |
| 2020/0118342 | A1* | 4/2020 | Varshney | H04S 7/304 |
| 2020/0126257 | A1* | 4/2020 | Tauber | G06T 7/292 |
| 2020/0134847 | A1* | 4/2020 | Gros | G06T 7/55 |
| 2021/0118182 | A1* | 4/2021 | Avnat | G06T 7/73 |

OTHER PUBLICATIONS

Mouragnon et al., "Generic and real-time structure from motion using local bundle adjustment," Image and Vision Computing 27 (2009) 1178-1193 (Year: 2009).*
Schneider et al., "Real-Time Bundle Adjustment with an Omnidirectional Multi-Camera System and GPS." In Proc. of the Int. Conf. on Machine Control and Guidance (MCG), pp. 98-103 (Year: 2014).*
Konolige, et al., "FrameSLAM: From Bundle Adjustment to Real-Time Visual Mapping", IEEE Transactions on Robotics, vol. 24, No. 5, pp. 1066-1077, Oct. 2008.
Mouragnon, et al., "Generic and Real Time Structure from Motion using Local Bundle Adjustment", Image Vision Comput. 27, pp. 1178-1193, 10.1016/j.imavis.2008.11.006, (2009).

(Continued)

*Primary Examiner* — Soo Shin
(74) *Attorney, Agent, or Firm* — Essential Patents Group, LLP.

(57) ABSTRACT

Techniques related to improved continuous local 3D reconstruction refinement are discussed. Such techniques include constructing and solving per 3D object adjustment models in real time to generate a point cloud and/or updated camera parameters for each object adjustment model.

21 Claims, 9 Drawing Sheets

(56) References Cited

OTHER PUBLICATIONS

Schonberger, et al., "Structure-from-Motion Revisited", IEEE Conference on Computer Vision and Pattern Recognition (CVPR), Las Vegas, NV, 2016, pp. 4104-4113.
Triggs, B. et al., "Bundle Adjustment—A Modern Synthesis", International Workshop on Vision Algorithms, Corfu, Greece, 1999.
Zheng, et al., "Joint Object Class Sequencing and Trajectory Triangulation (JOST)", 10.1007/978-3-319-10584-0_39; pp. 599-614, (2014).
Zheng, et al., "Sparse Dynamic 3D Reconstruction from Unsynchronized Videos", IEEE International Conference on Computer Vision (ICCV), Santiago, pp. 4435-4443, (2015).

* cited by examiner

CONTINUOUS LOCAL 3D RECONSTRUCTION REFINEMENT IN VIDEO

BACKGROUND

In various contexts, such as for sporting events or other high profile events, multiple (e.g., about 40) cameras are installed in view of a scene (e.g., around a stadium). Installation of multiple cameras, segmentation, and 3D reconstruction technologies are used to create volumetric contents for the purpose of providing an immersive media experience for users. For example, simultaneous or contemporaneous video of the scene is captured and a point cloud may be built to create a volumetric model of the scene and the point cloud may be then painted with the captured texture from multiple captured pictures of the scene in every moment such that a photo realistic 3D model of the scene is generated. Furthermore, a virtual camera or view within the 3D model may then be used to navigate in this 3D space and render an observed view to offer multiple degree of freedom for a highly immersive user experience.

Creating real-time volumetric video of the event in such contexts requires very high computational power. Furthermore, the final system output (e.g., rendered image on 3D model) needs to have very high quality to maintain the immersive user experience and ideally operate in real time. It is with respect to these and other considerations that the present improvements have been needed. Such improvements may become critical as the desire to provide immersive user experiences in 3D scenes attained by multiple cameras becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
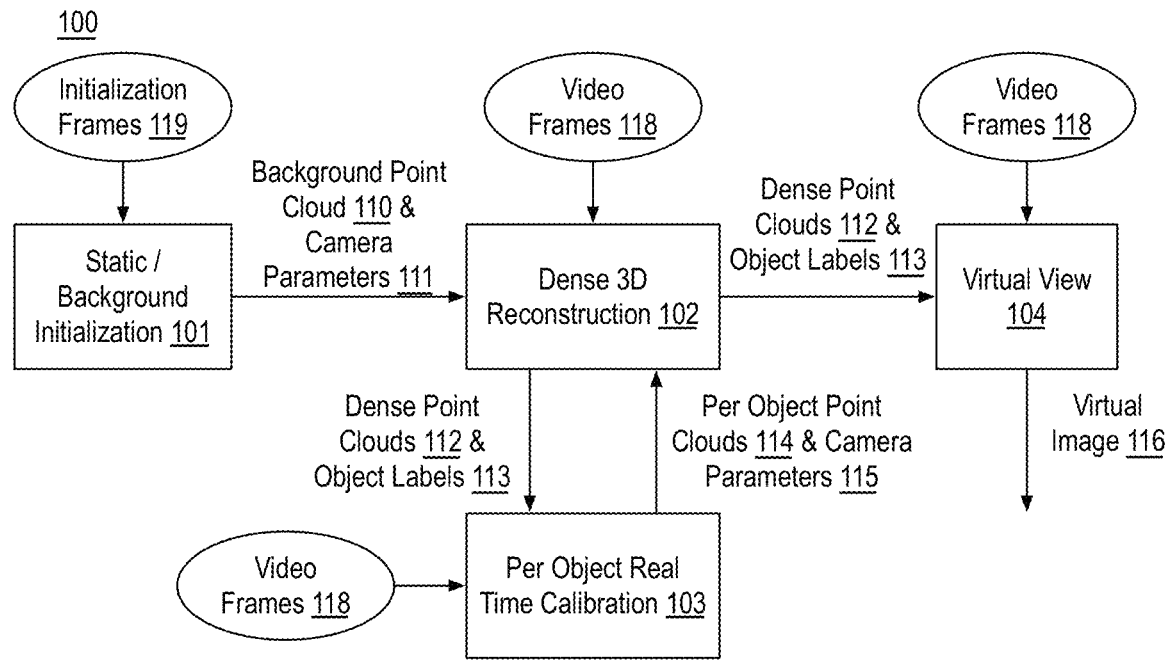
FIG. 1 illustrates an example system for generating a virtual view within a scene by providing per object calibration modeling.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to continuous 3D reconstruction refinement for the generation of high quality virtual views within a scene.

As described above, it may be necessary, in the context of 3D modeling using frames attained from multiple cameras trained on a scene and other contexts, to provide a very high quality 3D reconstruction of the scene for the generation of virtual views within the scene. Generation of such virtual views seeks to provide real time video streaming with 6 degrees-of-freedom (6 DOF) within the environment such that views from positions where physical cameras cannot be placed are provided to the user. It is the goal of such processing to provide minimum latency with high quality so the result is immersive for the viewer. Notably, since the goal is to present three dimensional dynamic motion of objects and persons in a scene (e.g., players on a pitch, basketball floor, etc.) based on voxels (three dimensional pixels), the fidelity of every single voxel is crucial for the total look of the immersive video output.

For example, multi view stereo (MVS) processing as discussed herein may include a first stage that provides calibration of a scene and a second stage that performs dense point cloud generation. The first stage may be characterized as structure from motion (SfM) processing and includes reconstructing 3D structure from projection of the 3D structure on a series of images (e.g., the projective geometry). In such processing, the input is a set of overlapping images of the same scene or object taken from varying viewpoints and the output is a 3D reconstruction of the object or scene and the reconstructed intrinsic and extrinsic camera parameters of all the images. Such SfM processing may be divided into stages including feature detection and extraction, feature matching and geometric verification, and structure and motion reconstruction. The techniques discussed herein focus on the last stage (structure and motion reconstruction), which optimizes a set of camera poses and feature points of a sparse point cloud, as discussed further herein.

For example, the first processing stage provides a sparse point cloud of an object or objects in the scene and calibrates all of cameras trained on the object or objects. The camera calibration results indicate three dimensional camera positions and three dimensional orientation of the cameras within a coordinate system imposed on the scene as well as intrinsic parameters of the cameras. Such parameters are characterized as camera parameters herein and may include extrinsic and intrinsic camera parameters. As used herein, the term position (or location) generally indicates coordinates of an object, feature point, camera, etc. within a coordinate system imposed on the scene (e.g., x, y, and z) and the term orientation, as the name indicates, provides the orientation of the object at the position and may be expressed in terms of pitch, yaw, and roll, for example. The term pose is used to indicate both the position and orientation of an item. Notably, in some instances, items may be provided a position only and, in some instances, items are provided both position and orientation (i.e. a pose). Furthermore, the terms 3D location or 3D position indicate a location or position that may be provided with 3 degrees of freedom (e.g., in a spatial coordinate system) while the terms 2D location or 2D position indicate a location or position that may be provided with 2 degrees of freedom (e.g., in a planar coordinate system such as on an image plane).

In a second stage, the calibration from the first stage is used to generate a dense point cloud. The dense point cloud may be based on translation of mutual two dimensional information between frames from neighboring cameras to a three dimensional localization of points and features to attain the dense point cloud. The dense point cloud may then be used to generate a virtual view within the scene. For example, a view from any position and orientation within the scene may be rendered and painted using the point cloud and texture information from frames of the scene. Herein, the term frame is used to indicate a frame of video or an image of the scene as attained from a camera. The terms frame and image are generally used interchangeably. It is noted that the accuracy and quality of the localized, dense point cloud used render virtual views is bounded by both the first and second stages.

In some embodiments, the discussed dense point cloud generation provides separation of objects into distinct reconstructed 3D objects. As used herein, the terms separate and distinct are used to indicate a model or data set is contained and does not rely on another model or data set. For example, a separate or distinct point cloud fully describes an object without reliance on additional data. Furthermore, a separate or distinct model may be solved without reliance on (and without influence by) other models or data outside of the model. Such dense point clouds include, for each point of the dense point cloud, an estimated 3D location of the point in the coordinate system of the 3D scene, an identification of the camera used to locate or create the point, and the position (e.g., in x, y coordinates) in a 2D image corresponding to the camera such that the position in the image corresponds to a 2D feature point of the image that corresponds to the 3D location of the point. For example, the 2D feature point in the image was extracted based on a distinctive feature corresponding thereto (the feature may be termed a descriptor as it describes the 2D point uniquely). Notably, the reprojection of the estimated 3D location of the point onto the image plane, after bundle adjustment for example, may not fully match the 2D feature point in the image. That is, each 2D feature point and corresponding estimated 3D location reprojection may provide a difference or loss (or energy, penalty, etc.). For example, a correspondence between the matching features of 2D points from multiple views to the 3D point triangulated by them is determined and a loss or energy is the reprojection error (e.g., level two, L2, distance between the 2D (x, y) projected point and the original (x, y) point where the feature was extracted. The combination (e.g., sum) of such losses across points may be reduced in the bundle adjustment model. Furthermore, such losses are influenced by the camera parameters, which may also vary in the solving of the bundle adjustment model. That is, the estimated 3D locations of points of the point cloud and the camera parameters, both intrinsic (e.g., focal length, etc.) and extrinsic (e.g., position and orientation) may be adjusted in solving the bundle adjustment.

Herein, such bundle adjustment modeling is performed on a per object basis such that multiple models are constructed and solved concurrently, one for each object or blob in the scene. Although discussed with respect to bundle adjustments, any suitable energy model may be constructed and solved. As used herein, the term construction with respect to a model indicates the generation of the model by establishing initialization parameters of the feature points, camera parameters, etc. and constraints on the parameters such as fixing some points (e.g., not allowing them to move when solving the model) and providing modeling constraints (e.g., providing the energy function to be minimized, etc.) The term solving with respect to a model indicates using the constructed model to generate resultant parameters for those parameters allowed to vary in the model. The term solve does not necessarily indicate an optimal solution is found as it may be advantageous to approximate solutions for the purposes of computational efficiency and/or it may not be viable to determine or define an optimal solution in such modeling contexts.

In some embodiments, the per object model construction (e.g., bundle adjustment model) generates an energy model that penalizes mismatches between the positions of detected features in frames (e.g., 2D feature points) and the reprojected positions of the features from their estimated positions in 3D space (e.g., 2D feature point reprojections). The model may also include other energy terms. As discussed, for a feature, there is a location of the feature as detected in a frame attained from a camera and a location corresponding to the feature as it is reprojected from its estimated position on the point cloud in the 3D coordinate system. Minimization of the energy model may nudge such positions closer to one another while taking into account the errors from many other features (e.g., tens or hundreds) as well as modeling and adjusting the poses (and intrinsic parameters) of the cameras within the coordinate system. Such techniques simultaneously optimize a set of camera parameters and 3D object points (e.g., points of a point cloud).

In some embodiments, each bundle adjustment model advantageously fixes one camera (e.g., fixes the camera parameters for the camera such that they cannot change when solving the bundle adjustment model) to provide a weak constraint to bind the bundle adjustment to the global scene. In some embodiments, such bundle adjustment modeling is only performed for dynamic (e.g., moving) objects such that only objects having a particular amount of motion are modeled. Furthermore, as discussed further below, for a particular object, resection (e.g., only varying camera parameters while fixing feature points) and intersection (e.g., only varying feature points while fixing camera parameters) may be alternated for the purpose of simplifying the model solution and optimal convergence. In some embodiments, solving each bundle adjustment model generates an updated point cloud for the object (optionally a less dense or sparse point cloud) as well as updated camera parameters.

In the contexts discussed herein, the cameras (or at least most cameras) are stationary (e.g., with well-known motion) yet the structure of the scene includes a combination of a static scene (e.g., a pitch or court in sporting contexts) combined with a non-rigid dynamic scene (e.g., moving sports players and objects) in varying motion speed and direction. As discussed further herein, the disclosed techniques offer real time calibration (e.g., allowing calibration and reconstruction in less than an inverse of a frame rate of video taken of the scene) in a combined dynamic and static scene with hundreds of feature tracks and high frequency change in structure in the field of view by providing per object modeling for calibration.

FIG. 1 illustrates an example system 100 for generating a virtual view within a scene by providing per object calibration modeling, arranged in accordance with at least some implementations of the present disclosure. As shown in FIG. 1, system 100 includes an initialization module 101 (labeled static/background initialization), a dense 3D reconstruction module 102, a per-object real time calibration module 103, and a virtual view module 104. System 100 may be implemented in any suitable device or grouping of devices. In some embodiments, system 100, or portions thereof, is implemented via a server computer, a cloud computing environment, a personal computer, a laptop computer, a tablet, or the like. In some embodiments, system 100 is implemented via a combination of such devices. In particular, system 100 may be implemented among several devices for the sake of improved performance such as computational speed. System 100 may be implemented as part of a hardware and software system in a venue or arena for example to provide virtual views within a scene.

Figure 2:
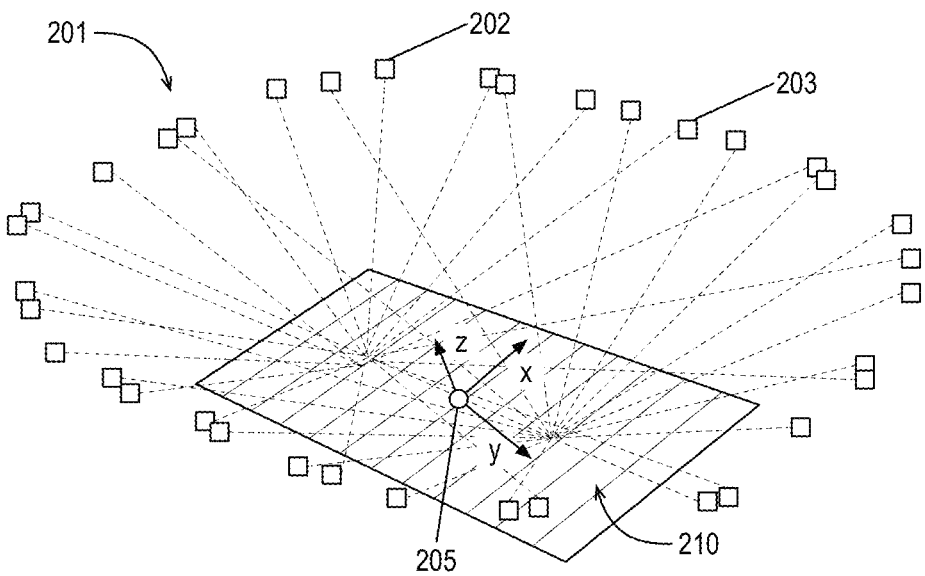
FIG. 2 illustrates an example camera array trained on an example scene for 3D modeling.

FIG. 2 illustrates an example camera array 201 trained on an example scene 210 for 3D modeling, arranged in accordance with at least some implementations of the present disclosure. Notably, scene 210 may be 3D modeled by system 100 and virtual views may be generated within the scene for an immersive user experience. In the illustrated embodiment, camera array 201 includes 36 cameras trained on a sporting field. However, camera array 201 may include any suitable number of cameras trained on scene 210, such as not less than 20 cameras with 40 or more cameras being advantageous. For example, camera array 201 may be trained on scene 210 to attain contemporaneous or simultaneous and overlapping video frames and sequences of scene 210 for generation of a real time 3D model of scene 210. Camera array 201 may be mounted to a stadium (not shown) surrounding the sporting field of scene 210, calibrated, and trained on scene 210 to capture contemporaneous or simultaneous images or video. As shown, each camera of camera array 201 has a particular view of scene 210. For example, camera 202 has a first view of scene 210 and camera 203 has a second view of scene 210, and so on. As used herein, the term view indicates the image content of an image plane of a particular camera of camera array 201 or image content of any view from a virtual camera located within scene 210. Notably, the view may be a captured view (e.g., a view attained using image capture at a camera) such that multiple views include representations of the same person, object, entity, etc.

Returning to FIG. 1, as shown, initialization module 101 receives initialization frames 119 from camera array 201 for the purposes of initializing scene 210 in a static or background setting such as when scene 210 is vacated and a performance or athletic contest is yet to begin. Furthermore, once initialized, and during real time implementation, dense 3D reconstruction module 102, per object real time calibration module 103, and virtual view module 104 may receive video frames 118 in an ongoing manner for use in their respective processing as needed. That is, system 100 receives video frames 118 for generation of the data structures discussed herein. Notably, at each time instance (e.g., at each frame capture), each camera of camera array 201 attains a video frame from its view of scene 210 such that synchronized video is attained. Such synchronized video is used to generate a dynamic 3D model of scene 210 relative to a coordinate system 205 (please refer to FIG. 2) established with respect to scene 210, and the dynamic 3D model is, in turn, used to generate virtual images 116 within the scene. In the example of FIG. 2, coordinate system 205 has an origin at a center surface of a field of play, however, any suitable origin may be used. The 3D model of scene 210 may be represented, for example, by any number of point clouds with each point of each point cloud providing a coordinate of a point on a surface of the object represented by the point cloud.

Initialization frames 119 and video frames 118 may be attained from camera array 201, memory, or any other source. For example, although discussed herein with respect to processing video attained from camera array 201, any video source may be used. Initialization frames 119 and video frames 118 may include any picture data, video frame data, image data, or the like or any data structure representative of a picture at any suitable resolution. In an embodiment, initialization frames 119 and video frames 118 have a 5 k resolution (e.g., a horizontal resolution of around 5,000 pixels such as 5120×3072 pixel resolution). In some embodiments, initialization frames 119 and video frames 118 have a resolution of not less than 4 k (e.g., a horizontal resolution of around 4,000 pixels and not less than 3840 pixels such as 3840×2160 pixel resolution or 4096×2160 pixel resolution). However, any suitable resolution of input video may be implemented.

Initialization module 101 receives initialization frames 119 and performs, prior to recording of a real time event within scene 210, an initialization SfM process, including, for example, a global bundle adjustment or relative bundle adjustment over static scene 210 (e.g., including the venue, bleachers, pitch, floor, etc.). Such SfM processing may also include feature detection and extraction and feature matching and geometric verification prior to such bundle adjustment processing. Although illustrated and discussed herein with respect to sporting events for the sake of clarity of presentation, scene 210 may include any suitable event such as entertainment events (concerts, recitals, etc.), political events, and so on.

As shown, initialization module 101 generates one or more background point clouds 110 and initialized camera parameters 111. As used herein, the term point cloud indicates any data structure representative of a number of points within coordinate system 205 (e.g., in a coordinate space). Typically, a point cloud indicates 3D points representative of a surface of an object or objects. For example, each 3D point (or, simply, point) of a point cloud may include x, y, z coordinates for a point on a surface of an object. Such point cloud data may include other information such as a direction normal to the surface, an identification of a feature, or object portion the point is a part of, or the like. For example, in the context of dense object point clouds, each point cloud may include an object label (e.g., identifying the object) and a camera set (e.g., identifying the cameras having a view of the point cloud) and each point of the point cloud may indicate a particular camera (or cameras) used to generate or identify the point and an x, y coordinate (or coordinates) within an image (or images) from the camera (or cameras) used to generate the point (e.g., feature point). That is, each 3D point of the point cloud (in coordinate system 205) may identify a 2D feature point (on an image plane of a frame attained by a particular camera) corresponding to the 3D point. Notably, the x, y coordinate of the feature point and the x, y coordinate of a reprojection of the 3D point onto the image plane may not match.

Furthermore, as used herein, the term camera parameters indicate one or both of extrinsic camera parameters and intrinsic camera parameters for each camera of camera array 201. Intrinsic camera parameters include those parameters intrinsic to the camera itself such as focal length, etc. Extrinsic camera parameters include the location (e.g., x, y, z coordinates) and rotation (e.g., pitch, yaw, roll) of the camera within coordinate system 205. Together, the location and rotation provide a pose of the camera. It is noted that some cameras of camera array 201 may be fixed but their pose within coordinate system is still part of the 3D model of the scene and may be better estimated throughout processing of the 3D model. That is, both camera poses and object point clouds are variables of the 3D model to be optimized.

As shown, background point clouds 110 and initialized camera parameters 111 are provided to dense 3D reconstruction module 102 for use in generation of dense point clouds 112 and object labels 113 in ongoing processing. For example, background point clouds 110 and initialized camera parameters 111 are initialization parameters for use in the dense multiview stereo pipeline. Dense 3D reconstruction module 102 receives background point clouds 110, initialized camera parameters 111, and video frames 118, and dense 3D reconstruction module 102 generates dense point clouds 112 and object labels 113 in an ongoing manner such as on a per frame set basis. Dense 3D reconstruction module 102 may generate point clouds 112 and object labels 113 using any suitable technique or techniques.

For example, dense 3D reconstruction module 102 has background point clouds 110 (e.g., a 3D model of the static scene) and dense 3D reconstruction module 102 receives per object point clouds 114 and camera parameters 115 (as discussed further below). Dense 3D reconstruction module 102 may align the camera models while reconstructing a dense 3D model. During such processing, dense 3D reconstruction module 102 segments 3D objects, performs dense reconstruction of such 3D objects and tracks the 3D objects both in the 3D model and in the 2D image frame space. Such techniques are known in the art and are not discussed further for the sake of brevity.

Figure 3:
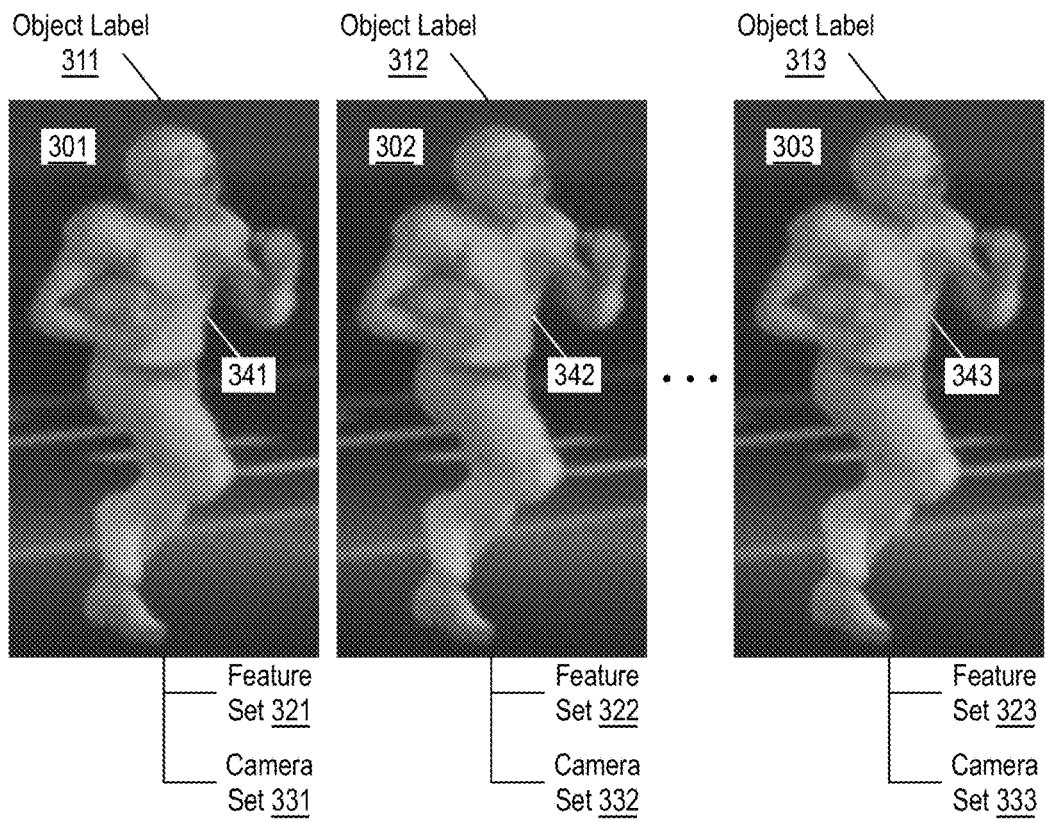
FIG. 3 illustrates exemplary dense point clouds and object labels corresponding to exemplary 3D objects.

FIG. 3 illustrates exemplary dense point clouds 112 and object labels 113 corresponding to exemplary 3D objects 301, 302, 303, arranged in accordance with at least some implementations of the present disclosure. As shown, each of 3D objects 301, 302, 303 are modeled and tracked by dense 3D reconstruction module 102. Notably, although illustrated with the same point cloud and pose of a player, 3D objects 301, 302, 303 may be different in implementation and may include any objects such as people, balls, etc. Furthermore, 3D objects 301, 302, 303 are represented by corresponding point clouds 341, 342, 343, object labels 311, 312, 313, feature sets 321, 322, 323, and camera sets 331, 332, 333. Such data structures are provided as dense point clouds 112 and object labels 113 from dense 3D reconstruction module 102 to per object real time calibration module 103 for processing as discussed herein.

For example, for 3D object 301, object label 311 identifies the object and may include any suitable data structure such as one or more of an indexing value, an object type, etc. Furthermore, object label 311 may identify whether 3D object 301 is static or dynamic (e.g., in motion or not) and/or a gross motion value for 3D object 301 (e.g., a rate of motion in distance over time). Point cloud 341 (e.g., a dense point cloud), as discussed, includes each point of the dense point cloud via an estimated 3D location of each point in the coordinate system (e.g., an x, y, z coordinate of each point). Furthermore, point cloud 341, feature set 321, and camera set 331 provides, for each point of point cloud 341 an identification of the camera used to generate or determine each point of the point cloud and an x, y position of a feature point corresponding to the point of the point cloud in an image or frame from that camera. Such data structures may be provided across point cloud 341, feature set 321, and camera set 331 using any suitable technique or techniques. For example, camera set 331 may indicate a subset of camera array 201 having a view of object 301 (e.g., an index listing of all cameras used to generate 3D points of point cloud 341) and each point of point cloud 341 may reference one of the camera subsets and provide an x, y position of the feature point in the image from the camera. In some embodiments, feature set 321 provides a data structure indicating the feature point corresponding to each 3D point of point cloud 341. For example, the 3D points of point cloud 341 may be indexed and feature set 321 may identify a camera of camera set 331 and an x, y coordinate on the image plane of a frame attained by the camera.

Similarly, for each of 3D objects 302, 303, and so on, corresponding object labels, 312, 313, point clouds 342, 343, feature sets 322, 323, and camera sets 332, 333 provide, for each 3D object, the following data: an object label for the 3D object (indicating an object type, whether the object is dynamic or static, and or a motion of the object), a point cloud of any number of 3D points each indicating a location in the 3D scene relative to coordinate system 205, and, for each point of the point cloud, a camera used to determine or locate the 3D point and an x, y position of a frame from the camera used to determine or locate the 3D point of the point cloud.

Returning to FIG. 1, per object real time calibration module 103 receives such data, as represented by dense point clouds 112 and object labels 113, for a particular time instance and corresponding to a particular set of frames from camera array 201. Per object real time calibration module 103 constructs and solves, for each 3D object, a separate bundle adjustment model. Notably, each bundle adjustment model uses only data corresponding to one 3D object and adjusts only the point cloud points for the 3D object and/or the camera parameters for the camera set relevant to the 3D object. That is, each bundle adjustment is localized to one 3D object and the cameras that view the 3D object. Such multiple, separate bundle adjustment models are constructed and solved in real time and at least partially concurrently to generate an updated 3D point cloud (e.g., a sparse point cloud) and updated camera parameters for each bundle adjustment model. For example, for a particular bundle adjustment model, updated 3D points of the point cloud for (only) that 3D object and/or updated camera parameters for only the camera set in view of the 3D object are generated.

In some embodiments, per object real time calibration module 103 receives, for each of multiple separate reconstructed 3D objects 301, 302, 303 in scene 210 at a particular time instance, 3D points for each 3D object, 2D feature points each indicating a location in one 2D frame or image corresponding to a 3D point (e.g., a point of a point cloud) of each 3D object, and a camera set indicating a subset of cameras of camera array 210 corresponding to the 2D images. Such information is received for each of 3D objects 301, 302, 303. For example, for 3D object 301, point cloud 341 of any number of 3D points are received. Furthermore, for 3D object 301, for each 3D point, a 2D feature point is received such that the 2D feature point indicates a location (e.g., x, y coordinates) of the feature within a particular frame or image attained by one of the cameras in camera set 331. Such information, for 3D object 301, along with camera parameters for camera set 331, will be used to construct and solve a bundle adjustment model for only 3D object 301. Similar data are received for each of 3D objects 302, 303 and separate bundle adjustment models will be constructed and solved.

As shown, such per object point clouds 114 and camera parameters 115 are provided to dense 3D reconstruction module 102 for use in generating dense 3D point clouds as discussed herein. Per object point clouds 114 and camera parameters 115 thereby provide real time calibration (and, in particular, camera calibration for a subset of cameras of camera array 201) for use in 3D object reconstruction. By providing per object calibration in real time, improved calibration is provided. Thereby, more robust and accurate 3D models are generated. Notably, full scene calibration techniques cannot be calibrated due to limitations with respect to the time needed and other limitations. In some embodiments, each of the bundle adjustment models are constructed and solved, dense 3D reconstruction is performed (e.g., updates to dense 3D reconstruction as needed), and a virtual view within scene 210 is generated prior to a next set of frames that are captured by camera array 201. For example, each of the bundle adjustment models are constructed and solved in a duration that is less than a target duration such that the target duration is the inverse of a frame rate of camera array 201 minus a predetermined virtual view duration (e.g., an estimated duration time needed to perform updates to the dense 3D reconstruction and generate a virtual view).

Figure 4:
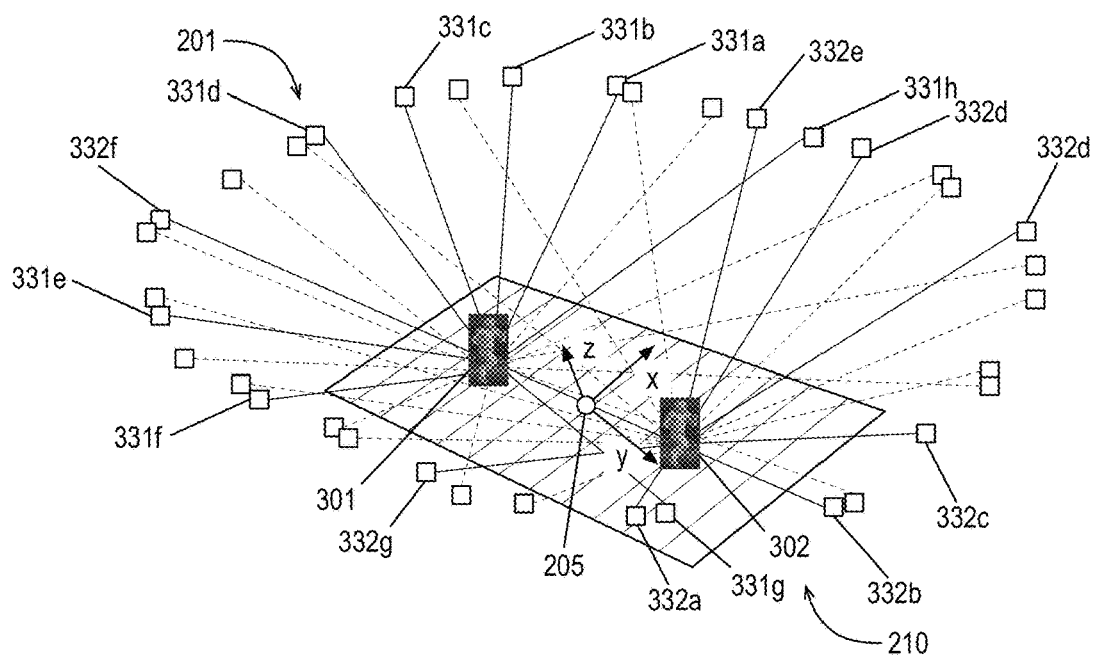
FIG. 4 illustrates exemplary 3D objects and corresponding camera sets within scene.

FIG. 4 illustrates exemplary 3D objects 301, 302 and corresponding camera sets 321 within scene 210, arranged in accordance with at least some implementations of the present disclosure. As shown, 3D objects 301, 302 may be located and modeled at any location in scene 210. Furthermore, 3D object 301 is reconstructed using camera set 331 (e.g., cameras 331a, 331b, 331c, . . . 331h). That is, each of cameras 331a, 331b, 331c, . . . 331h is used to reconstruct at least one point cloud point of 3D object 301. Similarly, 3D object 302 is reconstructed using camera set 332 (e.g., cameras 332a, 332b, 332c, . . . 332g).

In constructing and solving a bundle adjustment model for 3D object 301, the locations of 3D points of 3D point cloud 341 may be adjusted and/or the camera parameters of cameras 331a, 331b, 331c, . . . 331h may be adjusted. Such camera parameters may intrinsic and/or extrinsic parameters. Notably, in constructing and solving a bundle adjustment model for 3D object 301, the locations of points of 3D point cloud 342 and the camera parameters of cameras 332a, 332b, 332c, . . . 332g are not used. It is noted, that, in some instances, camera set 331 and camera set 332 may share one or more cameras. In some embodiments, when a bundle adjustment model for 3D object 301 and a bundle adjustment model for 3D object 302 both provide updated camera parameters for the same camera, the camera parameters may be used separately in 3D reconstruction or the camera parameters may be merged (e.g., averaged or the like) for use in 3D reconstruction. In embodiments where the camera parameters are used separately, a first set of camera parameters (from the first bundle adjustment model) is used for 3D reconstruction of 3D object 301 and a second set of camera parameters (from the second bundle adjustment model) is used for 3D reconstruction of 3D object 302.

As discussed, a bundle adjustment model is constructed and solved for each of 3D objects 301, 302, 303. Although discussed herein with respect to bundle adjustment models, any suitable model that adjusts the locations of points of 3D point cloud 341 and/or camera parameters may be used.

Figure 5:
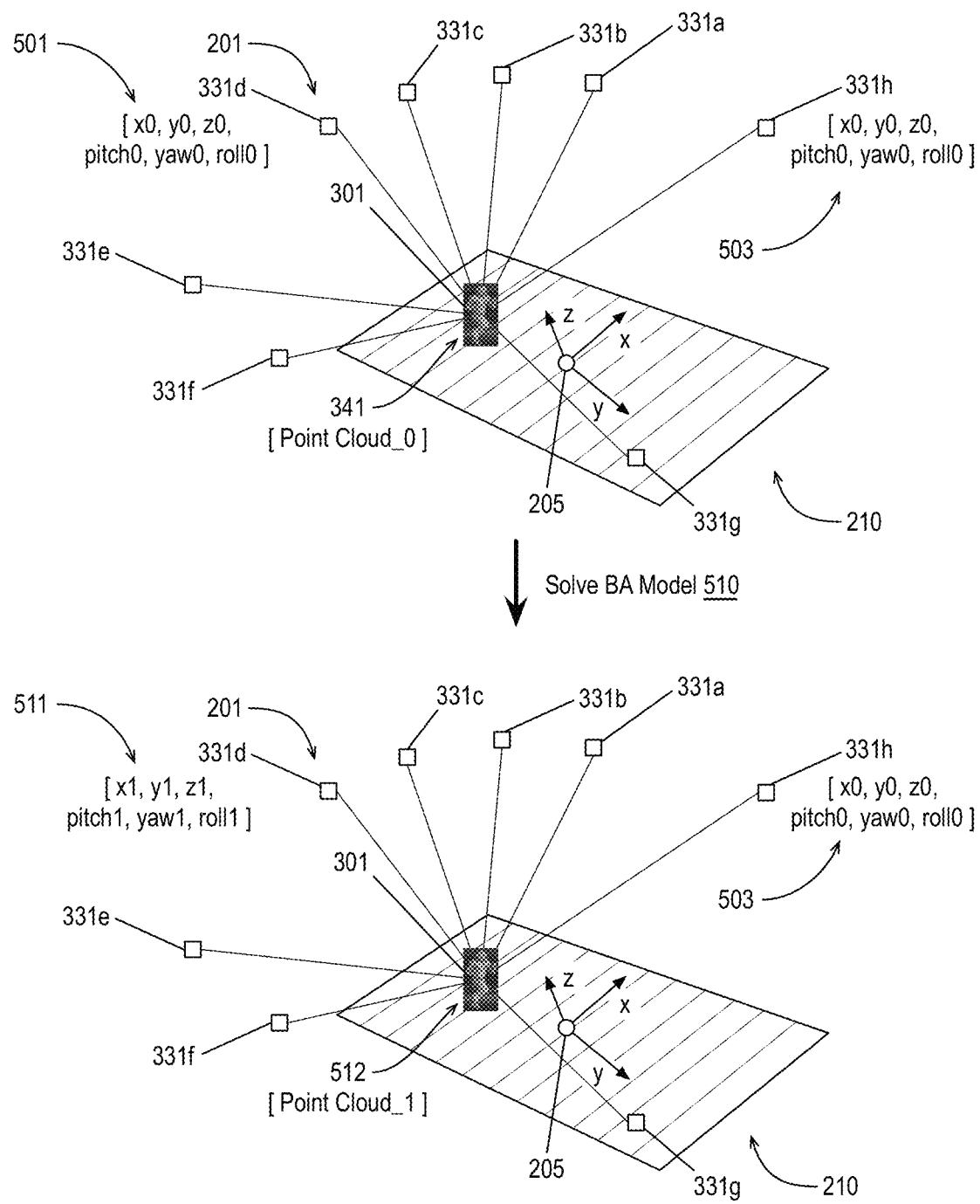
FIG. 5 illustrates an example bundle adjustment for an exemplary 3D object.

FIG. 5 illustrates an example bundle adjustment for exemplary 3D object 301, arranged in accordance with at least some implementations of the present disclosure. Notably, separate bundle adjustments for multiple 3D objects 301, 302, 303 may be performed concurrently, however, only one bundle adjustment model is illustrated for the sake of clarity. As shown, for 3D object 301, inputs to the bundle adjustment model include a current point cloud 341 (Point Cloud 0) for 3D object 301 and a current camera set 331 for 3D object 301 as received from dense 3D reconstruction module 102. As discussed, each point of point cloud 341 indicates a position of the point in coordinate system 205, a camera used to determine or locate the point, and an x, y coordinate of a feature point in an image from the camera used to determine or locate the point.

Notably, each of cameras 331a, 331b, 331c, ... 331h include initial camera parameters as illustrated with respect to camera 331d and 331h. For example, camera parameters 501 indicate intrinsic parameters (not shown) and extrinsic parameters for camera 331d. The illustrated extrinsic parameters for camera 331d include initial position and orientation (e.g., x0, y0, z0, pitch0, yaw0, roll0). Similarly, camera parameters 503 indicate intrinsic parameters (not shown) and extrinsic parameters for camera 331h. Notably, each of cameras 331a, 331b, 331c, ... 331h have such initial camera parameters but only those of cameras 331d, 331 are shown for the sake of clarity.

Figure 6:
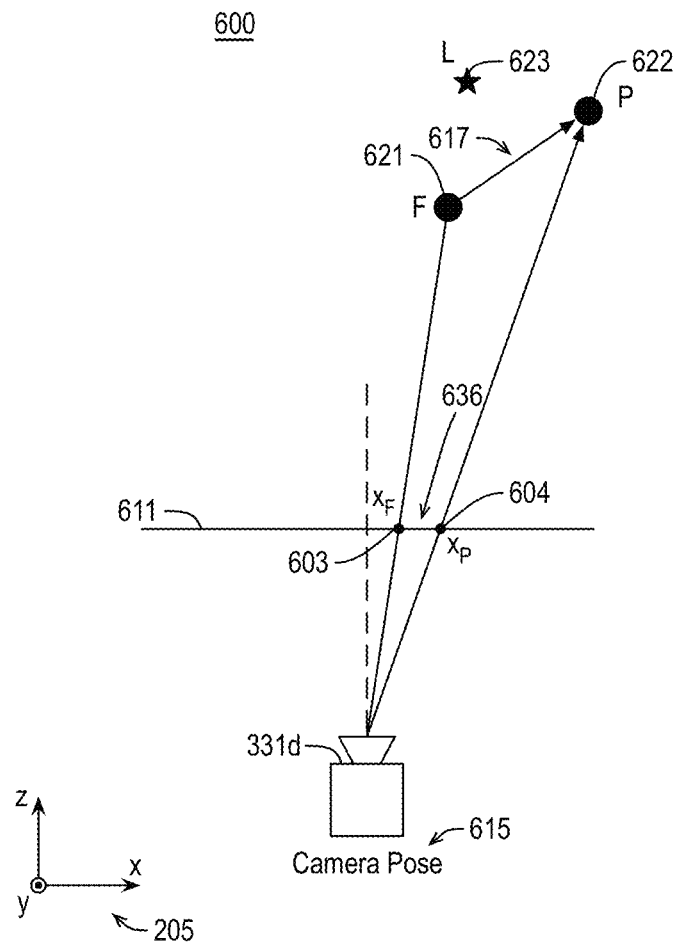
FIG. 6 illustrates an example context for providing a bundle adjustment for a point cloud landmark.

FIG. 6 illustrates an example context 600 for providing a bundle adjustment for a point cloud landmark 623, arranged in accordance with at least some implementations of the present disclosure. For example, landmark 623 may be an actual landmark in coordinate system 205 (e.g., such that the actual landmark position is an unknown and the discussed techniques seek to locate it and others with high accuracy). Current point cloud position (or point) 622 is an estimated position for landmark 623 in point cloud 341. That is, point cloud position 622 is a current point of point cloud 341 in the 3D model. Notably, point cloud position 622 (having x, y, z coordinates in coordinate system 205) has been located close to the actual position of landmark 623 but improvements, through modeling and bundle adjustment are desirable.

Furthermore, FIG. 6 illustrates point cloud position 622 has been determined or located (at least in part) by camera 331d of camera set 331. Furthermore, the 3D model has located and oriented camera 331d with a camera pose 615 such that camera pose 615 indicates a location (e.g., x, y, z coordinates) and an orientation (e.g., pitch, yaw, roll) of camera 331d (as provided by parameters 501). Furthermore, intrinsic camera parameters (not shown) have been established for camera 331d. Notably, such camera parameters (intrinsic and extrinsic) may also be determined and improved using bundle adjustment modeling. In each per object bundle adjustment model, there are many such landmarks/point cloud locations and cameras/camera parameters that are in play and adjustment of point cloud position 622 and the camera parameters for camera 331d must be optimized with respect to all such combinations (and not with respect to context 600 alone) and some such combinations (some variables may be fixed in the bundle adjustment as discussed further herein).

FIG. 6 also illustrates a feature point 603 ($x_F$) that corresponds to point cloud position 622 (as identified by point cloud 341 or feature set 321 as discussed herein) within a frame 611. That is, frame 611 may have been attained by camera 331d and feature point 603 may have been used to locate or define point cloud position 622. Notably, a projection of feature point 603 to a 3D feature location 621 (e.g., using stereoscopic techniques) may indicate a difference 617 between 3D feature location 621 and point cloud position 622. Similarly, projection of point cloud position 622 to the image plane of frame 611 provides a corresponding 2D point cloud projection point 604 ($x_P$). Notably, a difference 636 (which may have x and y components) on the image plane exists between feature point 603 and 2D point cloud projection point 604 in analogy to that of difference 617.

In constructing a bundle adjustment model, difference 636 (or difference 617) provides an error term (or energy term) that may be minimized in seeking to more accurately locate landmark 623. Along with many other such error terms or differences (e.g., for each point cloud position 622), the bundle adjustment model collectively models and reduces overall error to generate updated point cloud positions (including point cloud position 622) and/or updated camera parameters (including camera pose 615). Notably, the camera parameters influence the bundle adjustment model (via projection onto the image plane of frame 611, for example) and may be varied in its construction and solution. That is, point cloud positions and/or camera parameters are used as variables to be solved for in the bundle adjustment. That bundle adjustment may employ any suitable error terms, loss functions, etc. to take into account differences such as difference 636. In some embodiments, a sum of squares of differences in accordance with difference 636 may be minimized in the bundle adjustment model.

Returning to FIG. 5, as discussed, a local bundle adjustment model (e.g., using only information corresponding to 3D object 301) is constructed and solved. The adjustment model models errors between point cloud 341 and detected feature point locations for each point of point cloud 341 (e.g., based on a difference between the detected feature point location on a 2D image plane and a projected location of the point cloud point onto the 2D image plane) with the positions of the points in the point cloud and the camera parameters as variables for which the model solves. For example, the adjustment model may be non-linear and may be solved or estimated using any suitable technique or techniques.

As shown in FIG. 5, the constructed local bundle adjustment model is solved at operation 510. Notably, after solving the constructed local bundle adjustment model, an updated point cloud 512 (Point Cloud_2) and/or updated camera parameters are generated. For example, updated point cloud 512 may have new locations for some or all of the points of the point cloud with respect to point cloud 341. In some embodiments, updated point cloud 512 and point cloud 341 have different point densities such that updated point cloud 512 is a sparse point cloud having fewer points than dense point cloud 341. For example, a next dense point may be reconstructed using updated point cloud 512 and 3D reconstruction techniques.

In addition or in the alternative, updated camera parameters are generated as shown with respect to camera 331d having updated extrinsic camera parameters 511 including updated position and orientation (e.g., x1, y1, z1, pitch1, yaw1, roll1). For example, each of cameras 331a, 331b, 331c, ... 331h may have new or updated camera parameters (both intrinsic and extrinsic).

Furthermore, FIG. 5 illustrates that in the construction and solving of the bundle adjustment model, one camera (e.g., camera 331h in the illustrated example) may be fixed or bound such that the extrinsic camera parameters 503 are not allowed to vary in the adjustment model. Such binding techniques may provide a weak constraint on the local per 3D object bundle adjustments to maintain the scale and location (globally) within coordinate system 205. The fixed or bound camera may be selected using any suitable technique or techniques.

As discussed, a separate bundle adjustment model is constructed for each 3D object using the 3D points (e.g., points of point cloud 341), the 2D feature points (identifying feature points in a 2D image corresponding to the points of point cloud 341), and camera parameters of each camera used to generate the 2D images. Furthered, in some embodiments, in each bundle adjustment model, a selected camera is fixed to a current pose in the scene. Each of the bundle adjustment models are then solved, at least partially concurrently to generate, for each bundle adjustment model, updated camera parameters for each camera in the camera set and/or an updated point cloud for the 3D object.

In some embodiments, resection and intersection techniques are alternatingly employed for each object and bundle adjustment model. Such techniques alternate between fixing all camera parameters while allowing the 3D points to vary (intersection) and fixing all 3D points while allowing the camera parameters to vary (resection). Such techniques implement bundle adjustment that interleaves the steps of refining camera parameters (resection) and 3D points (intersection) to advantageously reduce the amount of computational overhead. For example, by limiting the parameter refinement to camera parameters or 3D points of point clouds, the computational complexity of constructing and solving the bundle adjustment model is reduced such that real time processing may be implemented.

Furthermore, in some embodiments, bundle adjustment modeling (e.g., model construction and solving) is only performed for those objects of scene 210 that are labeled as dynamic (e.g., in motion). For example, if an object is labeled as static, bundle adjustment modeling may be skipped for the current time instance. As discussed, the 3D construction pipeline (as implemented by dense 3D reconstruction module 102) may segment and label foreground objects (e.g., dynamic or in-field moving objects) and, for each labeled object, a dense point cloud is reconstructed in real time using mutual features in images while, for each object, a camera graph (or camera set) is stored individually such that the camera graph (or camera set) contains only the camera subset covering the object with respective key-point feature correspondences (feature tracks). In addition, each object may be labeled as static or dynamic and bundle adjustment modeling may be performed only for the dynamic objects (e.g., with the static or dynamic label being based on whether motion of the object is greater than or less than a threshold). For example, since the cameras of camera array 201 are typically stationary, after few bundle adjustment iterations and/or 3D reconstruction iterations, there is little or marginal contribution to the bundle adjustment of the cameras and the camera parameters of the individual labeled object reach relaxation. In some embodiments, a change in the localization of the object or its motion may trigger initiation of resuming bundle adjustment modeling. In some embodiments, object location and/or motion are tracked and used to trigger bundle adjustment modeling (e.g., when the location of the object moves by an amount greater than a threshold or moves at a rate greater than a threshold).

Returning now to FIG. 1, per object point clouds 114 and camera parameters 115 are provided to dense 3D reconstruction module 102 for use in generating dense 3D point clouds in an iterative and/or ongoing manner. In some embodiments, local per object calibration by per object real time calibration module 103 may be performed at a predetermined frequency (e.g., every 60th frame) while dense 3D reconstruction is performed on a per frame basis. Furthermore, as shown, dense point clouds 112 and object labels 113 may be provided (on a per frame basis or the like) to virtual view module 104.

Virtual view module 104 receives dense point clouds 112 and object labels 113, video frames 118, and a desired virtual camera pose input (e.g., a track of location and orientations inputs) or other user or application input (not shown) that indicates a desired virtual view within scene 210. The virtual camera pose may be at any location within scene 210 and may indicate an immersive view selection by a user (e.g., to experience scene 210 from the perspective of a player, the perspective of an overhead camera near scene action, etc.). Using the virtual camera pose, dense point clouds 112, and video frames 118, virtual view module 104 renders a view from the virtual camera pose. The techniques discussed herein provide for improved calibration and eventual improved 3D modeling and virtual view creation.

Figure 7:
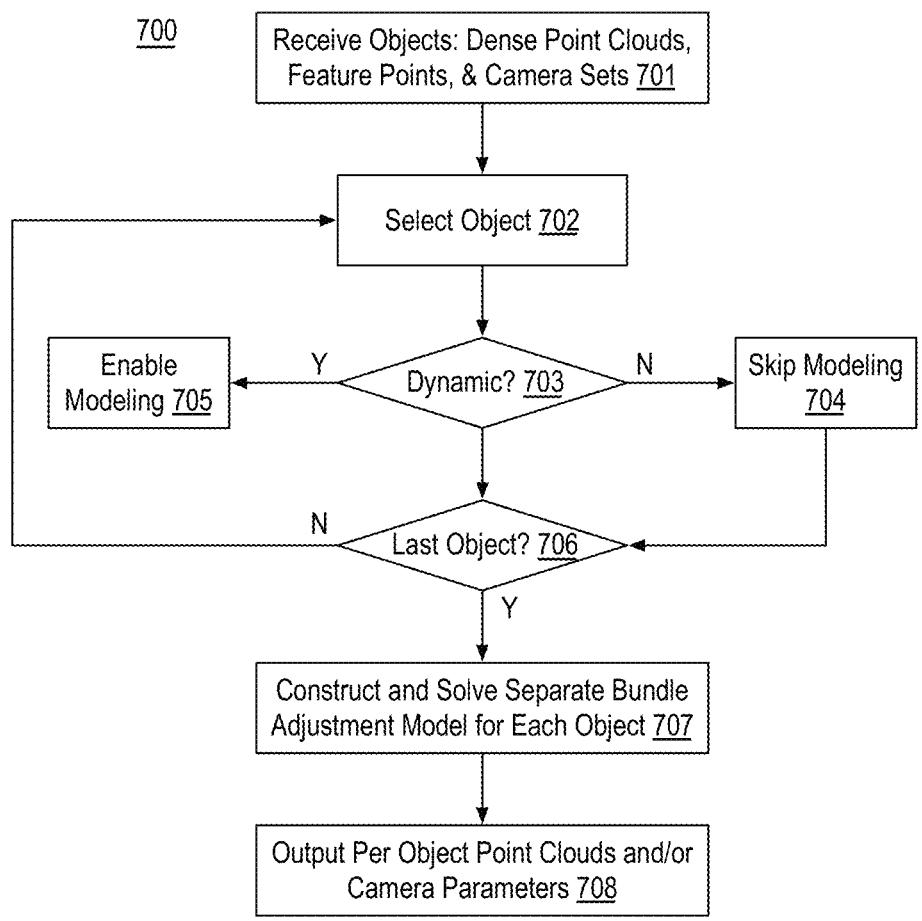
FIG. 7 illustrates an exemplary process for updating object point clouds and/or camera parameters based on per object adjustment modeling.

FIG. 7 illustrates an exemplary process 700 for updating object point clouds and/or camera parameters based on per object adjustment modeling, arranged in accordance with at least some implementations of the present disclosure. For example, process 700 may be performed by system 100 or any other system or device discussed herein to generate an updated point cloud and/or updated camera parameters based on per object adjustment model construction and solving for continuous local 3D reconstruction refinement.

Process 700 begins at operation 701, where 3D objects are received such that the received data structure for each 3D object includes a point cloud (including many 3D points indicating estimated point positions in a 3D coordinate system), feature points (including a feature point for each 3D point of the point cloud such that each feature point indicates a location of the feature point in a frame), and a camera set (indicating the cameras used to attain the frames having feature points). Notably, a point cloud, a set of feature points and a camera set are received for each object.

Processing continues at operation 702, where a first object is selected for processing and at decision operation 703, where a determination is made as to whether the object selected at operation 702 is dynamic. The determination as to whether the selected object is dynamic may be made using any suitable technique or techniques. For example, each object may be labeled as dynamic or static for current processing with only dynamic objects being modeled. In an embodiment, an object is labeled as dynamic when the motion of the object exceeds a threshold. In some embodiments, all objects are labeled as dynamic and processed until little or no motion is detected (e.g., the motion of the object is less than a threshold) for the object. Such processing allows for calibration to be provided for the object until it is stationary or has little movement. In some embodiments, for a previously static object, the object may be transitioned to dynamic when either the location change of the object or the rate of motion of the object exceeds a threshold. Furthermore, such position change and rate of movement of the object may be with respect to movement between positions in the coordinate system or with respect to change in shape of the point cloud itself.

If the object is determined to be static at decision operation 702, processing continues at operation 704, where adjustment modeling is skipped for the object. Notably, adjustment modeling for static objects may provide for relaxation of camera parameters to a steady state and additional modeling may not be necessary. If the object is determined to be dynamic at decision operation 702, processing continues at operation 705, where adjustment modeling is enabled for the object. Processing continues at decision operation 706, where a determination is made as to whether the last separate object in the scene has been selected. If not, processing continues at operation 702 as discussed above until a last object is processed.

After the last object has been processed, processing continues at operation 707, where separate adjustment models (e.g., bundle adjustment models) are constructed and solved for each of the separate objects as discussed herein. In some embodiments, each bundle adjustment model adjusts both point cloud points and camera parameters (with one camera having fixed extrinsic camera parameters). In other embodiments, the bundle adjustment model for each object alternates between resection (fixing point cloud points while allowing camera parameters, except for the fixed pose camera, to vary) and intersection (fixing all camera parameters while allowing point cloud points to vary) as discussed with respect to FIG. 8.

Processing continues at operation 708, where the per object updated point clouds and/or the updated camera parameters are output for use in dense 3D reconstruction as discussed herein. Notably, process 700, and the techniques discussed elsewhere herein, overcome the degeneracy in an initial calibration and dynamic changes within a scene, in part by the initial calibration triggering the reconstruction of moving labeled objects that in turn feeds back new features that belong to a specific reconstructed object. After the first stage a local modeling per subject is applied for improved local calibration. In some embodiments, the local modeling may implement resection-intersection (e.g., optimizing the cameras parameters and the point cloud positions in turns. For example, for a first frame set (t) camera parameters only are refined and at a second frame (t+1) point clouds only are refined, and so on. Using such techniques, the optimization problem (e.g., adjustment model) becomes feasible in terms real time processing.

Figure 8:
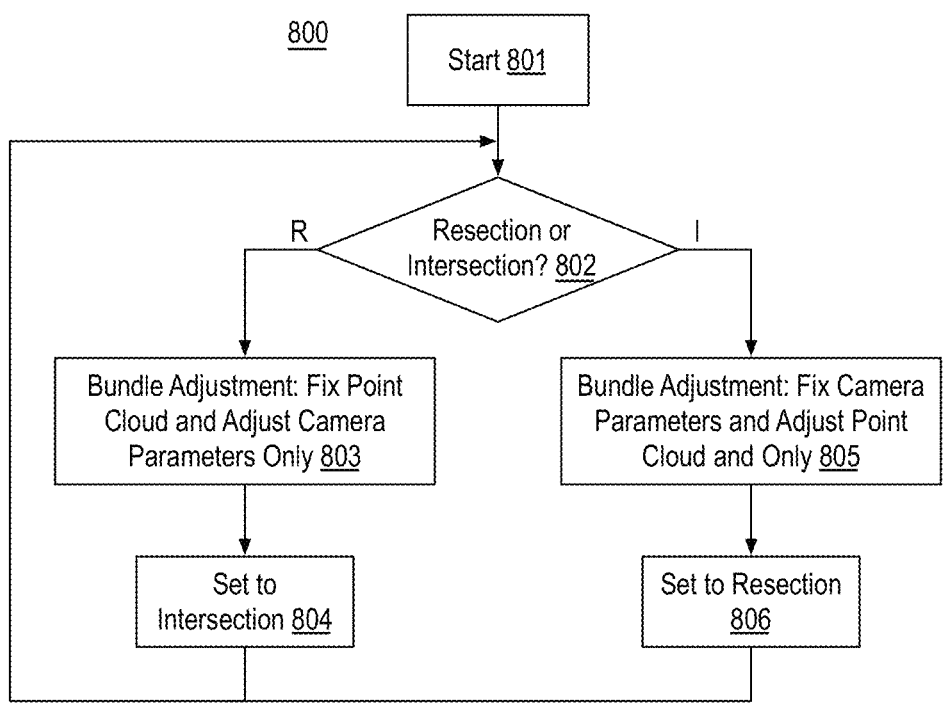
FIG. 8 illustrates an exemplary process for separately constructing and solving adjustment models using resection and intersection techniques.

FIG. 8 illustrates an exemplary process 800 for separately constructing and solving adjustment models using resection and intersection techniques, arranged in accordance with at least some implementations of the present disclosure. For example, process 800 may be implemented at operation 706 of process 700 for improved computational efficiency.

Process 800 begins at start operation 801, where adjustment model processing for an object begins. It is noted that process 800 may be performed in parallel for any number of objects as discussed herein while each object may be in differing resection/intersection modes and/or implementation of resection/intersection at all. For example, one or more objects may bypass resection/intersection. Furthermore, for those objects employing resection/intersection processing some may be in resection while others are in intersection.

Processing continues at decision operation 802, where, for a particular object, a determination is made as to whether the current adjustment modeling and solving is a resection iteration or an intersection iteration. Such a determination may be made using any suitable technique or techniques such as using flags corresponding to the object to indicate resection or intersection at the current iteration. If the object is flagged as having a resection iteration, processing continues at operation 803, where a bundle adjustment model is generated that fixes or binds all point cloud points (e.g., the model sets point cloud points as constants) and does not allow them to vary in solving the bundle adjustment model. That is, only camera parameters (with the exception of one camera used to loosely bind the per object bundle adjustment model to the global scene and global structure from motion model) are allowed to vary in the bundle adjustment model. Furthermore, the bundle adjustment model with fixed point cloud positions is solved to generate updated camera parameters only. Such updated camera parameters are then outputted for use in dense 3D reconstruction as discussed herein. Processing continues at operation 804, where a mode for the object at a next processing iteration is set to intersection. That is, in some embodiments, resection/intersection alternates for the object.

If the object is flagged as having a resection iteration at decision operation 802, processing continues at operation 805, where a bundle adjustment model is generated that fixes or binds all camera parameters (e.g., the model sets camera parameters as constants) and does not allow them to vary in solving the bundle adjustment model. That is, only point cloud points are allowed to vary in the bundle adjustment model. Furthermore, the bundle adjustment model with fixed camera parameters is solved to generate an updated point cloud. The updated point cloud is then outputted for use in dense 3D reconstruction as discussed herein. Processing continues at operation 806, where a mode for the object at a next processing iteration is set to resection in analogy to operation 804.

Although discussed with respect to alternating resection/intersection, any pattern of switching between resection and intersection modeling may be used. For example, modeling with adjustment of both camera parameters and point cloud positions may be mixed with resection/intersection in a resection/intersection/both vary pattern or a resection/both vary/intersection pattern. In addition or in the alternative, the frequency of resection, intersection, or both vary processing may be increased with respect to the others.

Figure 9:
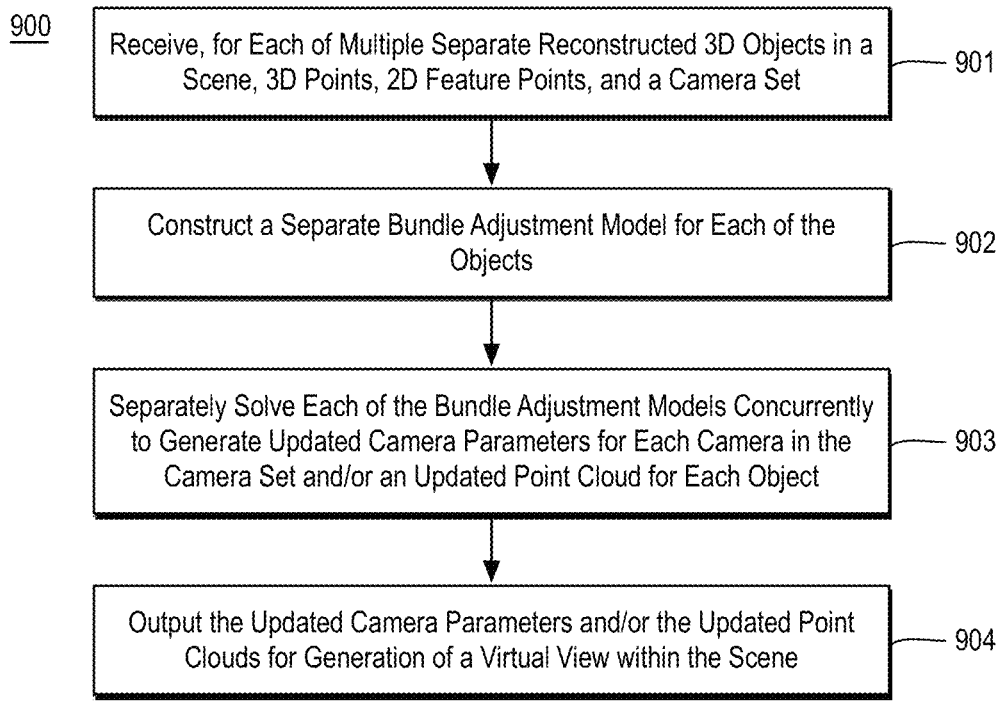
FIG. 9 is a flow diagram illustrating an example process for generating a virtual view within a scene.

FIG. 9 is a flow diagram illustrating an example process 900 for generating a virtual view within a scene, arranged in accordance with at least some implementations of the present disclosure. Process 900 may include one or more operations 901-904 as illustrated in FIG. 9. Process 900 may form at least part of a 3D model calibration process, a 3D model generation, or a virtual view generation process. By way of non-limiting example, process 900 may form at least part of a 3D model calibration process, a 3D model generation, or a virtual view generation process as performed by system 100 as discussed herein. Furthermore, process 900 will be described herein with reference to system 1000 of FIG. 10.

Figure 10:
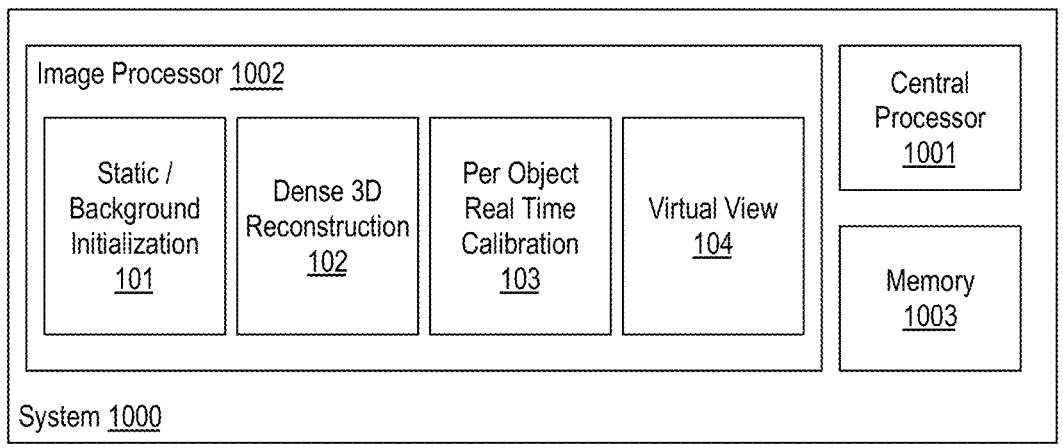
FIG. 10 is an illustrative diagram of an example system for generating a virtual view within a scene.

FIG. 10 is an illustrative diagram of an example system 1000 for generating a virtual view within a scene, arranged in accordance with at least some implementations of the present disclosure. As shown in FIG. 10, system 1000 may include a central processor 1001, an image processor 1002, and a memory 1003. Also as shown, image processor 1002 may include or implement one or more of initialization module 101, dense 3D reconstruction module 102, per object real time calibration module 103, and virtual view module 104. In the example of system 1000, memory 1003 may store point cloud data, camera parameters, feature point data, frame data, virtual image data, or any other data discussed herein.

As shown, in some examples, one or more or portions of initialization module 101, dense 3D reconstruction module 102, per object real time calibration module 103, and virtual view module 104 are implemented via image processor 1002. In other examples, one or more or portions of initialization module 101, dense 3D reconstruction module 102, per object real time calibration module 103, and virtual view module 104 are implemented via central processor 1001, an image processing unit, an image processing pipeline, an image signal processor, or the like. In some examples, one or more or portions of initialization module 101, dense 3D reconstruction module 102, per object real time calibration module 103, and virtual view module 104 are implemented in hardware as a system-on-a-chip (SoC). In some examples, one or more or portions of initialization module 101, dense 3D reconstruction module 102, per object real time calibration module 103, and virtual view module 104 are implemented in hardware via a FPGA.

Image processor 1002 may include any number and type of image or graphics processing units that may provide the operations as discussed herein. Such operations may be implemented via software or hardware or a combination thereof. For example, image processor 1002 may include circuitry dedicated to manipulate and/or analyze images obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory. In an embodiment, one or more or portions of initialization module 101, dense 3D reconstruction module 102, per object real time calibration module 103, and virtual view module 104 are implemented via an execution unit (EU) of image processor 1002. The EU may include, for example, programmable logic or circuitry such as a logic core or cores that may provide a wide array of programmable logic functions. In an embodiment, one or more or portions of initialization module 101, dense 3D reconstruction module 102, per object real time calibration module 103, and virtual view module 104 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 begins at operation 901, where, for each of multiple separate reconstructed 3D objects in the scene at a particular time instance, multiple 3D points for the 3D object, multiple 2D feature points each indicating a location in at least one of a plurality of 2D images corresponding to a 3D point of the 3D object, and a camera set indicating a subset of cameras of multiple cameras to attain frames of the scene corresponding to the 2D images are received. For example, the multiple 3D points for the 3D object may be part of or an entirety of a point cloud representing the 3D object. The multiple 2D feature points may correspond to the multiple 3D points with each 2D feature point indicating a location in one of a plurality of 2D images. For example, the 2D feature point may be in a frame attained for the scene by one of the cameras in the subset. As discussed, the subset of cameras (or camera graph) indicates those cameras used to generate at least one 2D feature point such that the subset of cameras is a subset of multiple cameras installed in a venue and trained on the scene to attain simultaneous video of the scene.

In some embodiments, process 900 further includes performing structure from motion processing for a background of the scene absent any dynamic objects to generate initial camera parameters for each of the plurality of cameras and a background point cloud comprising 3D points for identified features within the scene such that each of the separate bundle adjustment models includes the initial camera parameters. For example, the cameras trained on the scene may be initially calibrated for an empty venue or static scene or the like and such camera parameters may be used as initialization parameters in the bundle adjustment modeling. Furthermore, a background point cloud or static point cloud may be generated for use in dense 3D reconstruction of the scene.

Processing continues at operation 902, where a separate bundle adjustment model is constructed for each 3D object using the 3D points, the 2D feature points, and camera parameters of each camera in the camera set. For example, for N 3D objects, N separate bundle adjustment models are generated each based on, for the pertinent 3D object, the 3D points, the 2D feature points, and camera parameters for the camera subset corresponding to the 3D object. In some embodiments, in each bundle adjustment model, a selected camera is fixed to a current pose in the scene such that the selected camera pose does not change in solving the bundle adjustment model (e.g., the extrinsic camera parameters or both the extrinsic and intrinsic camera parameters for the selected camera are fixed or bound). In some embodiments, each of the separate bundle adjustment models includes a sum of loss functions, the loss functions each to measure a difference between a 2D feature point and a reprojected point for a corresponding 3D point such that the reprojected point is based on the camera parameters. For example, the sum of loss functions may sum a loss function for each combination of a 3D point reprojection and a 2D feature point.

Processing continues at operation 903, where each of the bundle adjustment models separately solving at least partially concurrently to generate, for each bundle adjustment model, at least one of updated camera parameters for cameras in the camera set or an updated point cloud for the 3D object. In some embodiments, both updated camera parameters and an updated point cloud are generated by solving each bundle adjustment model. Notably, the updated camera parameters may include updated parameters for all cameras except for the selected fixed camera which may have no updated parameters or intrinsic parameter updates only.

In some embodiments, the 3D points, the 2D feature points, and the camera set correspond to multiple first contemporaneous frames of the scene attained by the cameras trained on the scene at the particular time instance and each of the bundle adjustment models fixes every camera to current poses of the cameras in the scene. For example, the bundle adjustment models may be resection bundle adjustment models. In some embodiments, process 900 further includes receiving, for each of the plurality of separate 3D objects, multiple second 3D points for the 3D object, multiple second 2D feature points each indicating a second location in at least one of a plurality of second 2D images corresponding to a second 3D point of the 3D object, and a second camera set indicating a second subset of cameras multiple cameras corresponding to the second 2D images, constructing a second bundle adjustment model for each 3D object using the second 3D points, the second 2D feature points, and camera parameters of each camera in the second camera set, such that, in each second bundle adjustment model, a selected second camera is fixed to a second current pose in the scene and all second 3D points for each object are fixed to current second 3D point locations in the scene, and separately solving each of the second bundle adjustment models at least partially concurrently to generate, for each second bundle adjustment model, second updated camera parameters, such that all second 3D points for each 3D object remain fixed. For example, the second bundle adjustment models may be intersection bundle adjustment models.

In some embodiments, process 900 further includes alternatingly constructing and solving bundle adjustment models with fixed camera poses and constructing and solving second bundle adjustment models with fixed 3D points across multiple sets of simultaneous frames of the scene. For example, resection and intersection may be alternated for one or more of the objects.

In some embodiments, process 900 further includes tracking motion of each of the separate reconstructed 3D objects, detecting small or no motion for a first 3D object of the separate 3D objects based on a distance of motion of the first object being less than a threshold, and skipping constructing a second bundle adjustment model for the first 3D object in response to small or no motion being detected. In some embodiments, process 900 further includes dividing a full 3D model of the scene into background objects and the separate reconstructed 3D objects and labeling each of the separate reconstructed 3D objects as dynamic and the background objects as static, such that said receiving, constructing, separately solving and outputting are performed in response to the separate reconstructed 3D objects being labeled as dynamic and said receiving, constructing, solving and outputting are skipped for the background objects. For example, the separate bundle adjustment models for each 3D object may be performed based on the 3D object being dynamic and not static. In some embodiments, the 3D points for each separate reconstructed 3D object includes a dense point cloud having a greater 3D point density than the corresponding updated point cloud from solving the bundle adjustment model.

Processing continues at operation 904, where the updated camera parameters and/or the updated point clouds are output for use in generation of a virtual view within the scene. For example, using the updated camera parameters and/or the updated point clouds are used in dense 3D construction of a dense 3D model (including a dense 3D point cloud), which may, in turn, be used in generation of a virtual view within the scene. For example, a virtual pose within the scene may be selected and a view from the pose within the scene may be rendered and painted using the point cloud and texture information from frames of the scene to generate a virtual view (e.g., a rendered image from the virtual pose). The discussed process may be performed in real time to generate a high quality 3D reconstruction and high quality virtual images. In some embodiments, the discussed receiving, constructing, separately solving, and outputting of process 900 are performed in a duration less than a target duration, wherein the target duration is equal to an inverse of a frame rate corresponding to capture of the scene by the plurality of cameras minus a predetermined virtual view duration Process 900 may be repeated any number of times either in series or in parallel for any number of time instances, sets of frames of video, scenes, or the like. Process 900 may provide 3D scene calibration, 3D scene reconstruction, and virtual view generation. The techniques discussed herein provide for high quality reconstruction and an immersive view experience for a user. Such techniques address both the problem of real time structure from motion and of high frequency change variation in the motion of non-rigid objects. Such techniques divide a tracked scene into static and dynamic labeled objects to enable individual structure from motion and adjustment per labeled moving object while maintaining a weak constraint on binding to the structure from motion of the static scene. Furthermore, the discussed techniques provide an accurate point cloud generation throughout an entire video recording of a scene regardless of the localization of each object in the scene. Thereby, no visible inconsistencies in the volumetric output appear and the immersive experience for the user is more realistic.

Process 900 may be implemented by any suitable device(s), system(s), or platform(s) such as those discussed herein. In an embodiment, at least a portion of process 000 is implemented by a device having a memory to store data corresponding to separate reconstructed 3D objects, as well as any other discussed data structure, and one or more processors to perform any of operations 901-904. In an embodiment, the memory and a processor are implemented via a monolithic field programmable gate array integrated circuit. As used herein, the term monolithic indicates a device that is discrete from other devices, although it may be coupled to other devices for communication and power supply. In some embodiments, the memory and one or more processors are implemented in different devices.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
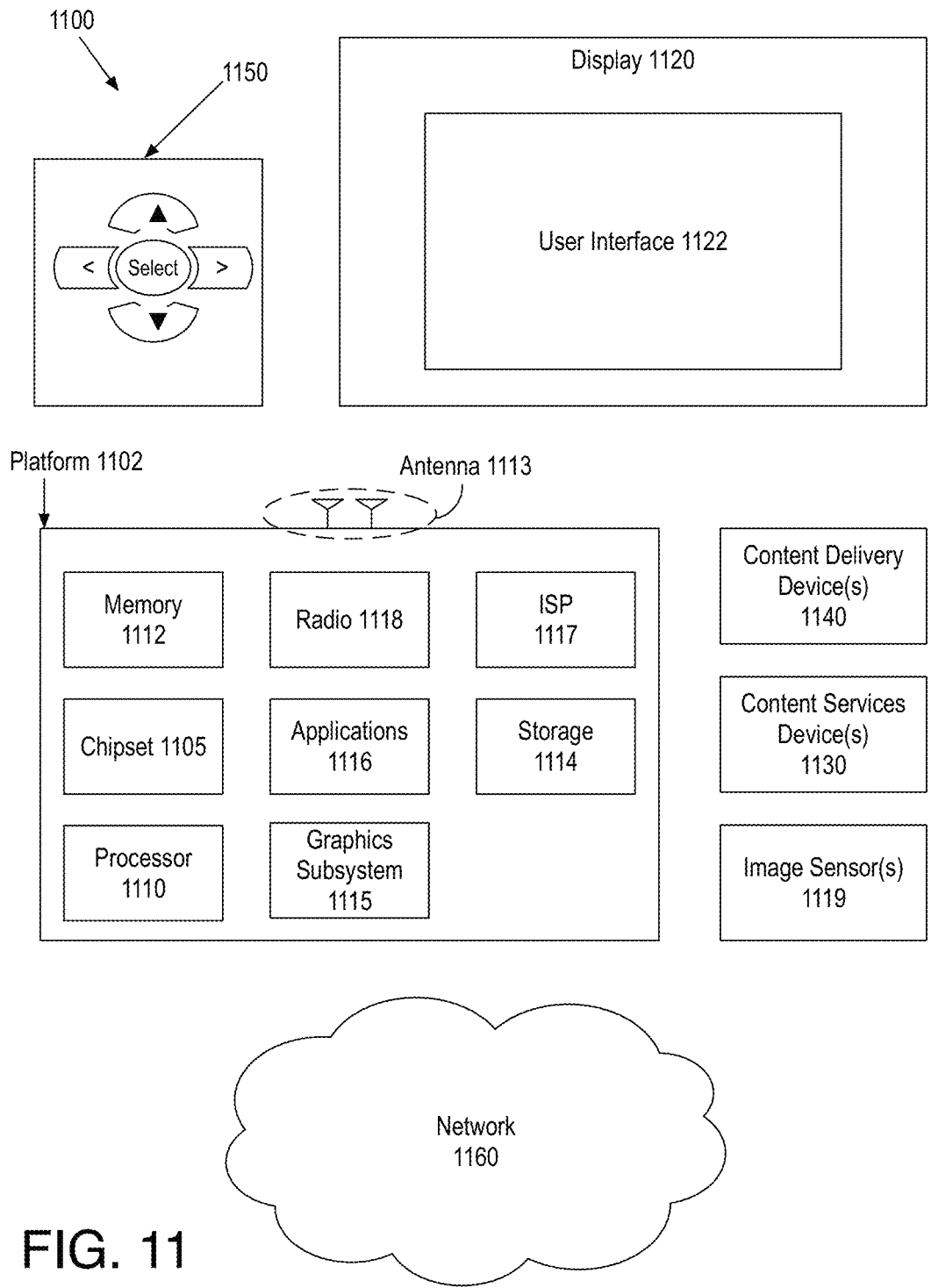
FIG. 11 is an illustrative diagram of an example system.

FIG. 11 is an illustrative diagram of an example system 1100, arranged in accordance with at least some implementations of the present disclosure. In various implementations, system 1100 may be a mobile device system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1100 includes a platform 1102 coupled to a display 1120. Platform 1102 may receive content from a content device such as content services device(s) 1130 or content delivery device(s) 1140 or other content sources such as image sensors 1119. For example, platform 1102 may receive image data as discussed herein from image sensors 1119 or any other content source. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116, image signal processor 1117 and/or radio 1118. Chipset 1105 may provide intercommunication among processor 1110, memory 1112, storage 1114, graphics subsystem 1115, applications 1116, image signal processor 1117 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

Image sensors 1119 may include any suitable image sensors that may provide image data based on a scene. For example, image sensors 1119 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1119 may include any device that may detect information of a scene to generate image data.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
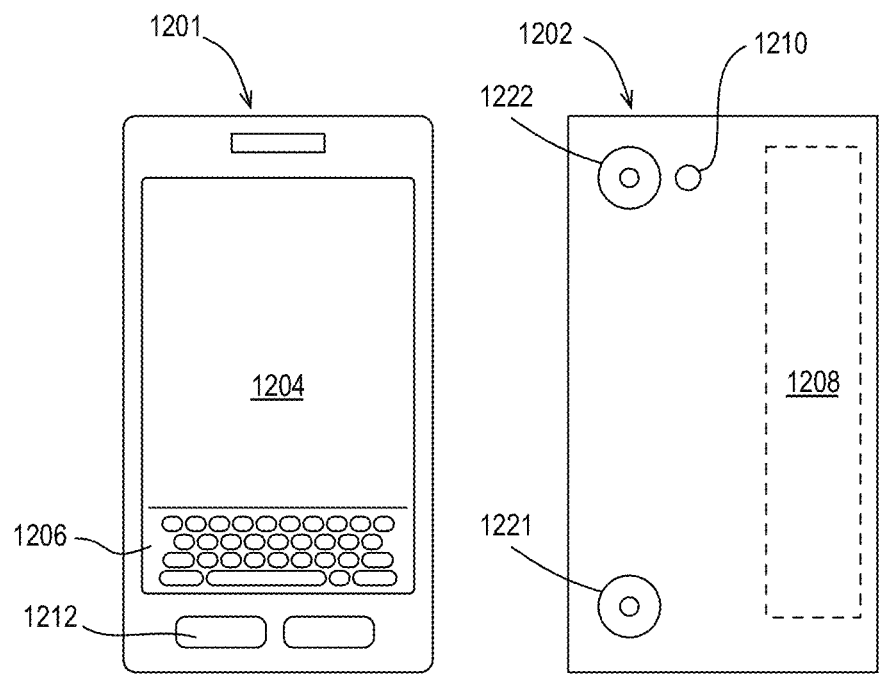
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems, components, or modules discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. pointand-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, a color camera 1221, a color camera 1222, and an integrated antenna 1208. In some embodiments, color camera 1221 and color camera 1222 attain planar images as discussed herein. In some embodiments, device 1200 does not include color camera 1221 and 1222 and device 1200 attains input image data (e.g., any input image data discussed herein) from another device. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include color cameras 1221, 1222, and a flash 1210 integrated into back 1202 (or elsewhere) of device 1200. In other examples, color cameras 1221, 1222, and flash 1210 may be integrated into front 1201 of device 1200 or both front and back sets of cameras may be provided. Color cameras 1221, 1222 and a flash 1210 may be components of a camera module to originate color image data with IR texture correction that may be processed into an image or streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating a virtual view within a scene comprises receiving, for each of a plurality of separate reconstructed 3D objects in the scene at a particular time instance, a plurality of 3D points for the 3D object, a plurality of 2D feature points each indicating a location in at least one of a plurality of 2D images corresponding to a 3D point of the 3D object, and a camera set indicating a subset of cameras of a plurality of cameras to attain frames of the scene corresponding to the 2D images, constructing a separate bundle adjustment model for each 3D object using the 3D points, the 2D feature points, and camera parameters of each camera in the camera set, separately solving each of the bundle adjustment models at least partially concurrently to generate, for each bundle adjustment model, at least one of updated camera parameters for cameras in the camera set or an updated point cloud for the 3D object, and outputting at least one of the updated camera parameters or the updated point clouds for use in 3D reconstruction of the scene.

In one or more second embodiments, further to the first embodiments, in each bundle adjustment model, a selected camera is fixed to a current pose in the scene.

In one or more third embodiments, further to the first or second embodiments, the 3D points, the 2D feature points, and the camera set correspond to a plurality of first contemporaneous frames of the scene attained by the plurality of cameras at the particular time instance and wherein each of the bundle adjustment models fixes every camera to current poses of the cameras in the scene.

In one or more fourth embodiments, further to any of the first through third embodiments, the method further comprises receiving, for each of the plurality of separate 3D objects, a plurality of second 3D points for the 3D object, a plurality of second 2D feature points each indicating a second location in at least one of a plurality of second 2D images corresponding to a second 3D point of the 3D object, and a second camera set indicating a second subset of cameras of the plurality of cameras corresponding to the second 2D images, constructing a second bundle adjustment model for each 3D object using the second 3D points, the second 2D feature points, and camera parameters of each camera in the second camera set, wherein, in each second bundle adjustment model, a selected second camera is fixed to a second current pose in the scene and all second 3D points for each object are fixed to current second 3D point locations in the scene, and separately solving each of the second bundle adjustment models at least partially concurrently to generate, for each second bundle adjustment model, second updated camera parameters, wherein all second 3D points for each 3D object remain fixed.

In one or more fifth embodiments, further to any of the first through fourth embodiments, the method further comprises alternatingly constructing and solving bundle adjustment models with fixed camera poses and constructing and solving second bundle adjustment models with fixed 3D points across a plurality of sets of simultaneous frames of the scene.

In one or more sixth embodiments, further to any of the first through fifth embodiments, the method further comprises performing structure from motion processing for a background of the scene absent any dynamic objects to generate initial camera parameters for each of the plurality of cameras and a background point cloud comprising 3D points for identified features within the scene, wherein each of the separate bundle adjustment models comprises the initial camera parameters.

In one or more seventh embodiments, further to any of the first through sixth embodiments, each of the separate bundle adjustment models comprises a sum of loss functions, the loss functions each to measure a difference between a 2D feature point and a reprojected point for a corresponding 3D point, the reprojected point based on the camera parameters.

In one or more eighth embodiments, further to any of the first through seventh embodiments, said receiving, constructing, separately solving and outputting are performed in a duration less than a target duration, wherein the target duration is equal to an inverse of a frame rate corresponding to capture of the scene by the plurality of cameras minus a predetermined virtual view duration.

In one or more ninth embodiments, further to any of the first through eighth embodiments, the method further comprises tracking motion of each of the separate reconstructed 3D objects, detecting small or no motion for a first 3D object of the separate 3D objects based on a distance of motion of the first object being less than a threshold, and skipping constructing a second bundle adjustment model for the first 3D object in response to small or no motion being detected.

In one or more tenth embodiments, further to any of the first through ninth embodiments, the method further comprises dividing a full 3D model of the scene into background objects and the separate reconstructed 3D objects and labeling each of the separate reconstructed 3D objects as dynamic and the background objects as static, wherein said receiving, constructing, separately solving and outputting are performed in response to the separate reconstructed 3D objects being labeled as dynamic and said receiving, constructing, solving and outputting are skipped for the background objects.

In one or more eleventh embodiments, further to any of the first through tenth embodiments, the plurality of 3D points for each separate reconstructed 3D object comprises a dense point cloud having a greater 3D point density than the corresponding updated point cloud from solving the bundle adjustment model.

In one or more twelfth embodiments, a device or system includes a memory and one or more processors to perform a method according to any one of the above embodiments.

In one or more thirteenth embodiments, at least one non-transitory machine readable medium includes a plurality of instructions that in response to being executed on a computing device, cause the computing device to perform a method according to any one of the above embodiments.

In one or more fourteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for generating a virtual view within a scene comprising:
    a memory to store, for each of a plurality of 3D objects in the scene at a particular time instance: a plurality of 3D points, a plurality of 2D feature points each indicating a location in at least one of a plurality of 2D images corresponding to one of the plurality of 3D points, and a camera set indicating a subset of cameras of a plurality of cameras to attain frames of the scene corresponding to the plurality of 2D images; and
    one or more processors coupled to the memory, the one or more processors to:
        construct a separate bundle adjustment model for each of the plurality of 3D objects using the plurality of 3D points for each 3D object, the plurality of 2D feature points for each 3D object, and camera parameters of each camera in the camera set for each 3D object, wherein, in the bundle adjustment model for each of the plurality of 3D objects, a first camera of the camera set for the 3D object is fixed to a current pose in the scene;
        separately solve each of the bundle adjustment models at least partially concurrently to generate, for the bundle adjustment model for each of the plurality of 3D objects, at least one of updated camera parameters for each camera in the camera set or an updated point cloud for each of the 3D objects; and
        output the updated camera parameters or the updated point clouds for use in 3D reconstruction of the scene.

2. The system of claim 1, wherein the plurality of 3D points, the 2D plurality of feature points, and the camera set correspond to a plurality of first contemporaneous frames of the scene attained by the plurality of cameras at the particular time instance, and wherein each of the bundle adjustment models fixes each camera in the subset of cameras to a fixed camera pose in the scene.

3. The system of claim 2, the one or more processors further to:
    alternatingly construct and solve each of the bundle adjustment models with the fixed camera poses and construct and solve second bundle adjustment models with fixed 3D points across a plurality of sets of simultaneous frames of the scene.

4. The system of claim 1, the one or more processors further to:
    perform structure from motion processing for a background of the scene absent any dynamic objects to generate initial camera parameters for each of the plurality of cameras and a background point cloud comprising 3D points for identified features within the scene, wherein each of the separate bundle adjustment models comprises the initial camera parameters.

5. The system of claim 1, wherein each of the separate bundle adjustment models comprises a sum of loss functions, the loss functions each to measure a difference between each of the plurality of 2D feature points and a reprojected point for a corresponding 3D point of the plurality of 3D points.

6. The system of claim 1, wherein the one or more processors to receive, construct, separately solve, and output are performed in a duration less than a target duration, wherein the target duration is equal to an inverse of a frame rate corresponding to capture of the scene by the plurality of cameras minus a predetermined virtual view duration.

7. The system of claim 1, the one or more processors further to:
track motion of each of the 3D objects;
detect a distance of motion for a first 3D object of the separate 3D objects is less than a threshold; and
skip construction of a second bundle adjustment model for the first 3D object in response to the distance of motion being less than the threshold.

8. The system of claim 1, the one or more processors further to:
divide a full 3D model of the scene into background objects and the 3D objects; and
label each of the 3D objects as dynamic and the background objects as static, wherein the one or more processors to receive, construct, separately solve, and output are performed in response to the 3D objects being labeled as dynamic and the one or more processors to receive, construct, separately solve, and output are skipped for the background objects.

9. The system of claim 1, wherein the plurality of 3D points for each separate reconstructed 3D object comprises a dense point cloud having a greater 3D point density than the corresponding updated point cloud from solving the bundle adjustment model.

10. A method for generating a virtual view within a scene comprising:
receiving, for each of a plurality of 3D objects in the scene at a particular time instance: a plurality of 3D points, a plurality of 2D feature points each indicating a location in at least one of a plurality of 2D images corresponding to one of the plurality of 3D points, and a camera set indicating a subset of cameras of a plurality of cameras to attain frames of the scene corresponding to the plurality of 2D images;
constructing a separate bundle adjustment model for each of the plurality of 3D objects using the plurality of 3D points for each 3D object, the plurality of 2D feature points for each 3D object, and camera parameters of each camera in the camera set for each 3D object;
separately solving each of the bundle adjustment models at least partially concurrently to generate, the bundle adjustment model for each of the plurality of 3D objects, at least one of updated camera parameters for each camera in the camera set or an updated point cloud for each of the 3D objects; and
outputting of the updated camera parameters or the updated point clouds for use in 3D reconstruction of the scene.

11. The method of claim 10, wherein the plurality of 3D points, the 2D plurality of feature points, and the camera set correspond to a plurality of first contemporaneous frames of the scene attained by the plurality of cameras at the particular time instance, and wherein each of the bundle adjustment models fixes each camera in the subset of cameras to a fixed camera pose in the scene.

12. The method of claim 11, further comprising:
alternatingly constructing and solving each of the bundle adjustment models with the fixed camera poses and constructing and solving second bundle adjustment models with fixed 3D points across a plurality of sets of simultaneous frames of the scene.

13. The method of claim 10, wherein said receiving, constructing, separately solving and outputting are performed in a duration less than a target duration, wherein the target duration is equal to an inverse of a frame rate corresponding to capture of the scene by the plurality of cameras minus a predetermined virtual view duration.

14. The method of claim 10, further comprising:
dividing a full 3D model of the scene into background objects and the 3D objects; and
labeling each of 3D objects as dynamic and the background objects as static, wherein said receiving, constructing, separately solving and outputting are performed in response to the 3D objects being labeled as dynamic and said receiving, constructing, solving and outputting are skipped for the background objects.

15. The method of claim 10, wherein each of the separate bundle adjustment models comprises a sum of loss functions, the loss functions each to measure a difference between each of the plurality of 2D feature points and a reprojected point for a corresponding 3D point of the plurality of 3D points.

16. At least one non-transitory machine readable medium comprising a plurality of instructions that, in response to being executed on a computing device, cause the computing device to generate a virtual view within a scene by:
receiving, for each of a plurality of 3D objects in the scene at a particular time instance: a plurality of 3D points, a plurality of 2D feature points each indicating a location in at least one of a plurality of 2D images corresponding to one of the plurality of 3D points, and a camera set indicating a subset of cameras of a plurality of cameras to attain frames of the scene corresponding to the plurality of 2D images;
constructing a separate bundle adjustment model for each of the plurality of 3D objects using the plurality of 3D points for each 3D object, the plurality of 2D feature points for each 3D object, and camera parameters of each camera in the camera set for each 3D object;
separately solving each of the bundle adjustment models at least partially concurrently to generate, the bundle adjustment model for each of the plurality of 3D objects, at least one of updated camera parameters for each camera in the camera set or an updated point cloud for each of the 3D objects; and
outputting of the updated camera parameters or the updated point clouds for use in 3D reconstruction of the scene.

17. The non-transitory machine readable medium of claim 16, wherein the plurality of 3D points, the 2D plurality of feature points, and the camera set correspond to a plurality of first contemporaneous frames of the scene attained by the plurality of cameras at the particular time instance, and wherein each of the bundle adjustment models fixes each camera in the subset of cameras to a fixed camera pose in the scene.

18. The non-transitory machine readable medium of claim 17, further comprising instructions that, in response to being executed on a computing device, cause the computing device to generate the virtual view within the scene by:
alternatingly constructing and solving each of the bundle adjustment models with the fixed camera poses and constructing and solving second bundle adjustment models with fixed 3D points across a plurality of sets of simultaneous frames of the scene.

19. The non-transitory machine readable medium of claim 16, wherein said receiving, constructing, separately solving and outputting are performed in a duration less than a target duration, wherein the target duration is equal to an inverse of a frame rate corresponding to capture of the scene by the plurality of cameras minus a predetermined virtual view duration.

20. The non-transitory machine readable medium of claim 16, further comprising instructions that, in response to being executed on a computing device, cause the computing device to generate the virtual view within the scene by:
dividing a full 3D model of the scene into background objects and the 3D objects; and
labeling each of 3D objects as dynamic and the background objects as static, wherein said receiving, constructing, separately solving and outputting are performed in response to the 3D objects being labeled as dynamic and said receiving, constructing, solving and outputting are skipped for the background objects.

21. The non-transitory machine readable medium of claim 16, wherein each of the separate bundle adjustment models comprises a sum of loss functions, the loss functions each to measure a difference between each of the plurality of 2D feature points and a reprojected point for a corresponding 3D point of the plurality of 3D points.

* * * * *